(12) United States Patent
Tomita (10) Patent No.: US 7,143,590 B2
(45) Date of Patent: Dec. 5, 2006

(54) VEHICLE AIR CONDITIONER

(75) Inventor: Hiroyuki Tomita, Nagoya (JP)

(73) Assignee: Denso Corporation, Kariya (JP)

( * ) Notice: Subject to any disclaimer, the term of this patent is extended or adjusted under 35 U.S.C. 154(b) by 319 days.

(21) Appl. No.: 10/695,534

(22) Filed: Oct. 28, 2003

(65) Prior Publication Data

US 2004/0103675 A1    Jun. 3, 2004

(30) Foreign Application Priority Data

Oct. 31, 2002    (JP)    ............... 2002-318315

(51) Int. Cl.
F25B 49/00    (2006.01)
F25B 41/00    (2006.01)
(52) U.S. Cl. .................... 62/126; 62/208; 62/211
(58) Field of Classification Search .............. 62/126, 62/208, 211
See application file for complete search history.

(56) References Cited

U.S. PATENT DOCUMENTS

| | | | |
|---|---|---|---|
| 5,582,021 A * | 12/1996 | Masauji .................... 62/126 |
| 5,752,391 A * | 5/1998 | Ozaki et al. ................ 62/228.1 |
| 6,012,297 A * | 1/2000 | Ichishi et al. .............. 236/49.3 |
| 6,202,934 B1 | 3/2001 | Kamiya et al. |
| 6,397,615 B1 | 6/2002 | Kawai et al. |
| 6,488,213 B1 * | 12/2002 | Ohga et al. ................ 236/49.3 |
| 6,796,137 B1 * | 9/2004 | Liu et al. .................... 62/228.3 |
| 2001/0039806 A1 | 11/2001 | Kawai et al. |
| 2002/0125332 A1 * | 9/2002 | Aoki et al. ................ 236/49.3 |
| 2003/0226658 A1 * | 12/2003 | Tsunoda .................... 165/203 |

FOREIGN PATENT DOCUMENTS

| | | |
|---|---|---|
| JP | 64-43847 | 2/1989 |
| JP | 10-278539 | 10/1998 |
| JP | 2001-150920 | 6/2001 |
| JP | 2002-283830 | 10/2002 |

OTHER PUBLICATIONS

Gt. Britain Search Report dated Mar. 19, 2004 in corresponding Application No. GB 0324382.1.
Office Action dated Jun. 13, 2006 in Japanese Application No. 2002-318315 with English translation.

* cited by examiner

Primary Examiner—Cheryl Tyler
Assistant Examiner—B. Clayton McCraw
(74) Attorney, Agent, or Firm—Harness, Dickey & Pierce, PLC

(57) ABSTRACT

In a vehicle air conditioner, at least one of an inner surface temperature of a passenger compartment and a surface temperature of a passenger in each detection area is the passenger compartment is detected by an infrared rays sensor, and a control unit determines a solar radiation condition such as a solar radiation amount and a solar radiation direction in the passenger compartment based on the surface temperature detected by the infrared rays sensor. The control unit controls operation of an operation member such as an air mixing door, based on the determined solar radiation condition. Thus, uncomfortable feeling given to the passenger can be reduced regardless of the solar radiation condition.

28 Claims, 6 Drawing Sheets

|  |  |  |  |  |  |  | (°C) |
|---|---|---|---|---|---|---|---|
| 28.5 | 27.6 | 26.0 | 25.0 | 26.0 | 26.5 | 24.7 | 24.0 |
| 28.2 | 26.8 | 26.2 | 25.2 | 25.6 | 27.5 | 25.5 | 24.5 |
| 28.7 | 27.0 | 26.1 | 25.5 | 25.5 | 27.8 | 25.8 | 24.5 |
| 29.0 | 28.5 | 26.8 | 25.8 | 25.2 | 27.2 | 26.0 | 24.5 |

(371) — 28.7 row
(372) — 29.0 row

FIG. 6

INITIALIZED Tset     LEARNED Tset

VEHICLE AIR CONDITIONER

CROSS-REFERENCE TO RELATED APPLICATION

This application is related to and claims priority from Japanese Patent Application No. 2002-318315 filed on Oct. 31, 2002, the content of which is hereby incorporated by reference.

BACKGROUND OF THE INVENTION

1. Field of the Invention

The present invention relates to a vehicle air conditioner which controls a temperature and an amount of conditioned air to be blown into a passenger compartment in accordance with an environmental condition of the vehicle, such as a solar radiation amount and a solar radiation direction.

2. Description of Related Art

In a conventional vehicle air conditioner, a temperature, an amount and the like of conditioned air to be blown into a passenger compartment are controlled in accordance with predetermined control characteristics, based on an environmental condition such as detection values of an outside air temperature sensor, an inside air temperature sensor and a solar radiation sensor. For example, in a vehicle air conditioner disclosed in JP-A-64-43847, a control unit performs a learning air-conditioning control by changing the control characteristics for every user.

In the vehicle air conditioner having a learning air-conditioning control, the control characteristics are changed based on an air-conditioning setting state manually set by a passenger. Specifically, when an air temperature is manually changed by the passenger in an air-conditioning control performed based on the predetermined control characteristics, it is determined that the predetermined control characteristics do not reflect the passenger's preference. In this case, the control characteristics are changed based on the manually set state.

However, even when a solar radiation amount detected by the solar radiation sensor does not change, if a solar radiation condition such as a solar radiation direction changes, thermal feeling of the passenger is changed. Therefore, in this case, uncomfortable feeling is sometimes given to the passenger. Especially, in the vehicle air conditioner having the learning air-conditioning control, if the change of the solar radiation direction frequently occurs, manual operation is required to be frequently performed in order to remove the uncomfortable feeling, regardless of the operation of the learning air-conditioning control. For example, when a direction of solar radiation radiated to a passenger on a driver seat frequently changes, the manual operation is required to be frequently performed.

SUMMARY OF THE INVENTION

In view of the above-described problem, it is an object of the present invention to provide a vehicle air conditioner capable of reducing uncomfortable feeling given to a passenger regardless of a solar radiation condition.

According to an aspect of the present invention, a vehicle air conditioner includes an air conditioning unit for performing air conditioning of a passenger compartment of the vehicle, an environmental-condition detecting device for detecting an environmental condition of the vehicle, a control characteristic memory means for storing a control characteristic showing a relationship between the environmental condition detected by the environmental-condition detecting device and a control value applied to an operation portion, and a control unit for controlling operation of the operation portion based on the control characteristic stored in the control characteristic memory means by using the environmental condition detected by the environmental-condition detecting device. In the air conditioner, the environmental-condition detecting device includes a surface temperature detecting means for detecting at least one of an inner surface temperature of the passenger compartment and a surface temperature of a passenger in each detection area of the passenger compartment. Accordingly, the air-conditioning operation can be performed by controlling the operation of the operation portion in accordance with a solar radiation condition including a solar radiation direction, thereby reducing uncomfortable feeling given to the passenger regardless of the solar radiation condition.

Preferably, the control unit has a control-characteristic changing means for changing the control characteristic stored in the control characteristic memory means when a control value is manually changed by a manual setting device in a given environmental condition of the control characteristic Therefore, even when the solar radiation condition is changed, an air-conditioning control characteristic reflecting a passenger's preference in a predetermined solar radiation condition can be learned, and uncomfortable feeling given to the passenger can be reduced regardless of the solar radiation condition.

Preferably, the operation portion includes an air temperature adjusting device for adjusting the temperature of conditioned air to be blown into the passenger compartment, the environmental-condition detecting device further includes a solar radiation amount detecting means for detecting a solar radiation amount radiated into the passenger compartment, and the control characteristic memory means stores a relationship between a control value applied to the air temperature adjusting device and a first solar radiation thermal load obtained based on the solar radiation amount detected by the solar radiation amount detecting means and the surface temperature detected by the surface temperature detecting means in each detection area of the passenger compartment, as a control characteristic for controlling the air temperature adjusting device. In this case, the temperature of air blown into the passenger compartment can be accurately controlled in accordance with the solar radiation condition including the solar radiation direction.

More preferably, the operation portion further includes a blower for blowing conditioned air of the air conditioning unit into the passenger compartment, and the control characteristic memory means stores a relationship between a control value applied to the blower and a second solar radiation thermal load obtained from the solar radiation amount detected by the solar radiation detecting device.

According to an another aspect of the present invention, a vehicle air conditioner includes a temperature adjusting unit for adjusting a temperature of conditioned air to be blown into a passenger compartment of the vehicle, a blower for blowing conditioned air into the passenger compartment, an area temperature detecting device for detecting temperatures in a plurality of detection areas around a passenger in the passenger compartment, a target temperature calculating means for calculating a target air temperature based on at least a set temperature, an inside air temperature inside the passenger compartment, an outside air temperature outside the passenger compartment and a solar radiation amount that is calculated based on the temperature detected by the area temperature detecting device, and a control means for controlling the temperature and a flow amount of conditioned air to be blown into the passenger compartment by controlling the temperature adjusting unit and the blower in accordance with the calculated target air temperature. In the vehicle air conditioner, the detection areas at least include an area where the temperature is changed in accordance with a solar radiation direction, and the control means determines an air outlet mode in accordance with the calculated target air temperature. Therefore, the air-conditioning operation can be performed in accordance with the solar radiation condition, thereby reducing uncomfortable feeling of the passenger without respect to the solar radiation condition. Preferably, the area temperature detecting device is constructed with a surface temperature detecting means for detecting at least one of an inner surface temperature of the passenger compartment and a surface temperature of a passenger in each detection area of the passenger compartment. Alternatively, the area temperature detecting device is constructed with a plurality of temperature detecting elements each of which is disposed near the inner surface of the passenger compartment in detection areas of the passenger compartment.

Preferably, the control means calculates the solar radiation amount Ts by a formula of Ts=Tdr−Tr−Tam, in which Tdr is an average temperature of the temperatures in detection areas around a windshield of a driver's seat detected by the area temperature detecting device, Tr is the inside air temperature and Tam is the outside air temperature. In this case, the solar radiation amount can be determined without using a solar radiation sensor. Alternatively, a solar radiation detecting means can be provided for detecting only a total amount of solar radiation radiated into the passenger compartment. In this case, a solar radiation amount calculating means calculates a solar radiation amount corresponding to each seat area by using the detected total amount of solar radiation and a weighted value that is obtained from the area temperature detected by the area temperature detecting device in consideration of the solar radiation direction for each seat area in the passenger compartment, and the target-temperature calculating means calculates a target temperature of conditioned air to be blown to each seat area based on the solar radiation amount corresponding to each seat area.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

(First Embodiment)

Figure 1:
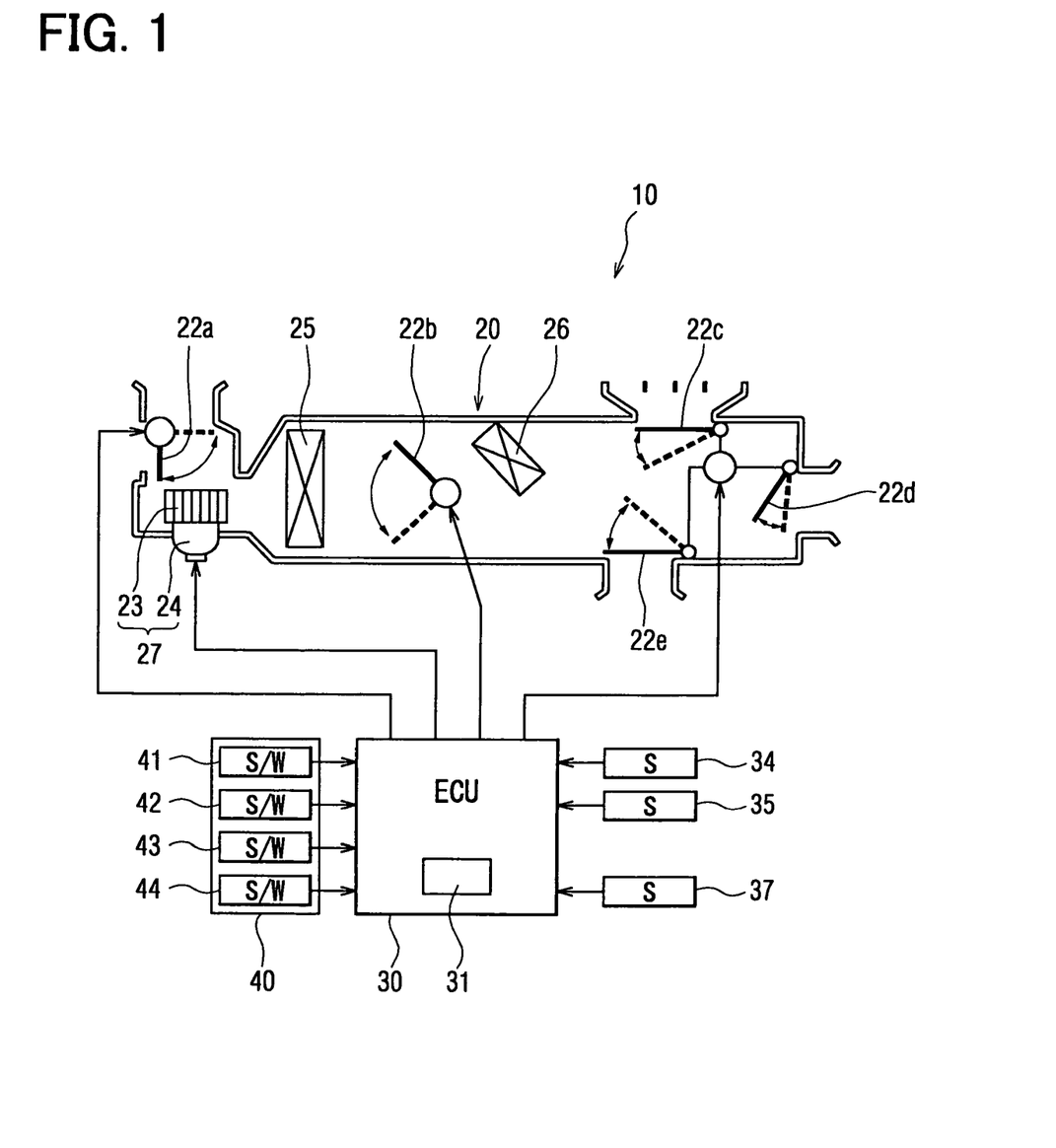
FIG. 1 is a schematic diagram showing a vehicle air conditioner according to a first embodiment of the present invention.

The first embodiment will be now described with reference to FIGS. 1–6. As shown in FIG. 1, a vehicle air conditioner 10 includes an air conditioning unit 20. Generally, the air conditioning unit 20 is disposed in an instrument panel (dashboard) positioned on a front side in a passenger compartment. An inside-outside air switching door 22a is disposed in the air conditioning unit 20 at the most upstream portion. The inside-outside air switching door 22a is disposed to open and close an outside air inlet and an inside air inlet, so that an inside-outside air introduction mode such as an inside air introduction mode and an outside air introduction mode can be set. The switching door 22a is rotatably moved by an actuator (not shown), to change a flow ratio between an inside air amount and an outside air amount introduced into the air conditioning unit 20. A blower 27, constructed of a blower motor 24 and a blower fan 23 fixed to the blower motor 24, sucks air from the outside air inlet or/and the inside air inlet into the air conditioning unit 20, and blows the sucked air to a downstream side in the air conditioning unit 20. An evaporator 25 for cooling air and a heater core 26 for heating air are provided downstream of the blower 27.

The evaporator 25 is connected to a compressor (not shown) and the like of a refrigerant cycle. Refrigerant is evaporated in the evaporator 25 by absorbing heat from air passing therethrough, so that air passing through the evaporator 25 is cooled. Engine-cooling water (hot water) is circulated into the heater core 26, so the heater core 26 heats air passing therethrough using the engine-cooling water as a heat source. An air mixing door 22b is provided upstream of the heater core 26, and open degree of the air mixing door 22b is adjusted by an actuator (not shown). In this way, a flow ratio between air passing through the heater core 26 and air bypassing the heater core 26 is adjusted, thereby controlling a temperature of air to be blown into the passenger compartment. As the open degree of the air mixing door 22b becomes smaller, the air temperature becomes lower. The air mixing door 22b is an operation portion in the present invention, and is used as an air temperature adjusting device for adjusting temperature of air to be blown into the passenger compartment.

A defroster door 22c, a face door 22d and a foot door 22e, for switching an air outlet mode, are provided in the air conditioning unit 20 at the most downstream side. The doors 22c, 22d, 22e are operated by an actuator (not shown), so that conditioned air is blown into the passenger compartment in each air outlet mode. An amount of air blown by the blower 27 and open degrees of the doors 22a, 22b, 22c, 22d, 22e are controlled by a control unit 30 (ECU). Specifically, the blower 27 and the doors 22a, 22b, 22c, 22d, 22e are controlled based on signals output from the control unit 30 through a voltage controller (not shown) and an actuator (not shown).

The control unit 30 includes a central processing unit (not shown), a memory device 31 for storing control characteristics and the like. The memory device 31 stores initial control characteristics, specifically, an inside-outside air mode control characteristic of the switching door 22a, an open degree control characteristic of the air mixing door 22b, an air-outlet mode control characteristic of the doors 22c, 22d, 22e and a voltage control characteristic applied to the blower 27. The control characteristics are predetermined so as to be changed in accordance with a target air temperature TAO blown into the passenger compartment.

Environmental condition signals output from environmental-condition detecting devices and operation signals output from an operation portion 40 are input to the control unit 30. The environmental-condition detecting devices includes an outside air temperature sensor 34 for detecting an outside air temperature Tam, a water temperature sensor 35 for detecting a temperature Tw of engine-cooling water, an infrared rays sensor (IR sensor) 37 described later, a temperature sensor (not shown) for detecting an air temperature directly after passing through the evaporator 25 and the like. The operation portion 40 includes an automatic switch 41 for setting an automatic control, an air-outlet mode switch 42 for setting an air outlet mode, a temperature setting switch 43 for setting a set temperature Tset, an air amount switch 44, an inside-outside air mode switch and the like. Here, a face mode, bi-level mode, a foot mode and defroster mode can be set as the air outlet mode. When the automatic control is set by the automatic switch, an automatic operation can be performed based on stored environmental condition values such as the outside air temperature Tam, and the set temperature Tset.

The temperature setting switch 43 is for manually setting the temperature Tset of conditioned air to be blown from the air conditioning unit 20 into the passenger compartment. The temperature setting switch 43 is constructed only with an up switch for increasing the set temperature and a down switch for reducing the set temperature, and does not have a set temperature display. In this way, the conditioned air temperature can be manually set by the temperature setting switch 43 in accordance with passenger's preference without a passenger preconception due to the set temperature display. That is, the set temperature set by the temperature setting switch 43 is not indicated. The temperature setting switch 43 is a control-value manual setting device in the present invention.

Figure 2:
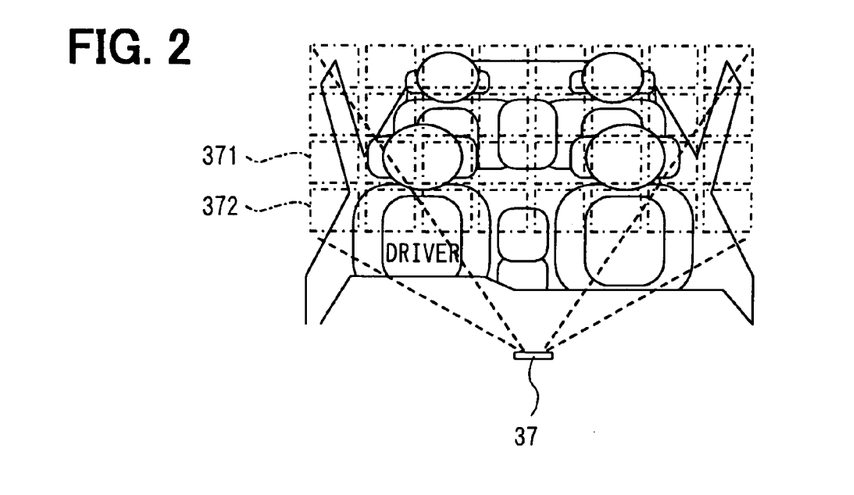
FIG. 2 is a schematic diagram showing a temperature detecting method using an infrared rays sensor (IR sensor) according to the first embodiment.

The IR sensor 37 is used as one of the environmental-condition detecting devices. The IR sensor 37 is disposed at a front-upper portion in the passenger compartment to detect area temperatures. As shown in FIG. 2, an inner space of the passenger compartment is separated into plural detection areas (e.g., 32 areas enclosed by one-dot chain lines shown in FIG. 2), and infrared-ray intensity in each detection area is detected by the IR sensor 37. Thus, the IR sensor 37 detects a temperature of an inner surface (an interior surface and a glass inner surface) of the passenger compartment and a surface temperature of the passenger in each detection area, and the detected temperature of the IR sensor 37 is input to the control unit 30. The IR sensor 37 is a surface temperature detecting means (area temperature detecting means) for detecting the surface temperature in the detection areas in the present invention.

Figure 3:
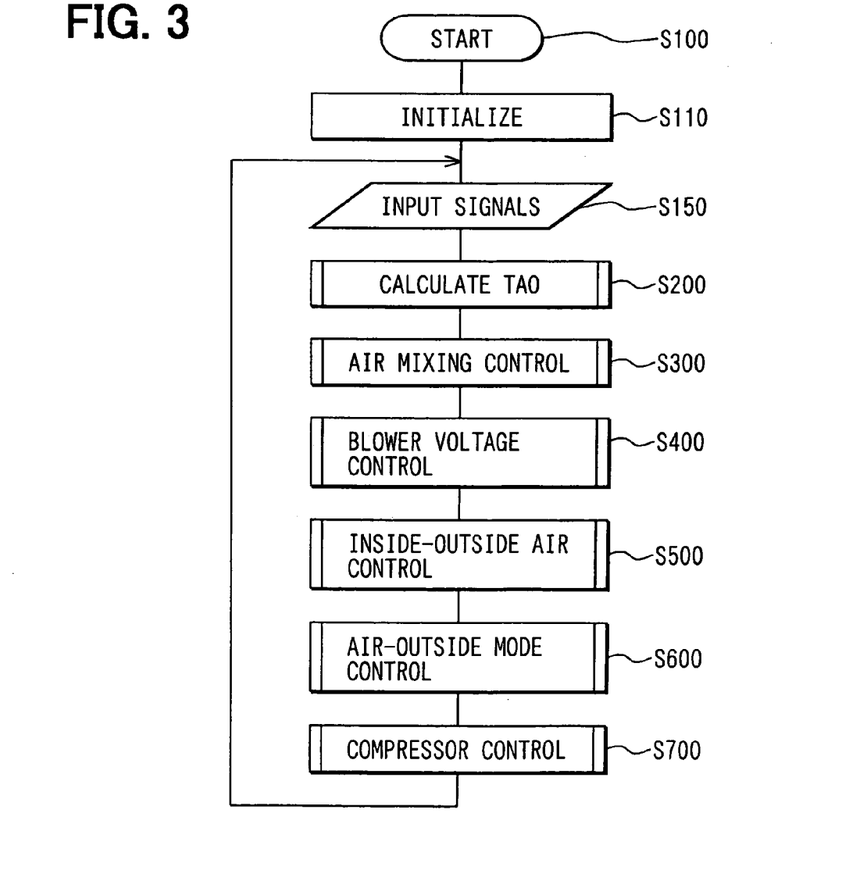
FIG. 3 is a flow diagram showing an entire control process of a control unit according to the first embodiment.

Next, operation of the vehicle air conditioner 10 according the first embodiment will be described. As shown in FIG. 3, the control unit 30 starts a control process at step S100 by turning on an ignition switch of the vehicle, and initializes conversion coefficients, flags and the likes at step S110. At step S150, environmental conditions are input from the outside air temperature sensor 34, the water temperature sensor 35, the IR sensor 37 and the like, and switch operation states are also input from the operation portion 40.

At step S200, the target air temperature TAO of air to be blown into the passenger compartment is calculated by using the following formula (1) based on various environmental conditions and the likes input at step S150. That is, the target air temperature TAO is calculated based on a stored set temperature Tset and the environmental condition values (i.e., the inside air temperature Tr, the outside air temperature Tam, the solar radiation amount Ts).

$$TAO = Kset \times Tset - Kr \times Tr - Kam \times Tam - Ks \times Ts + C \qquad (1)$$

Wherein, Kset, Kr, Ks are coefficients, and C is a constant. The target air temperature TAO is a basic value for controlling air-conditioning state. In the first embodiment, the inside air temperature Tr is an average value of temperatures in the detection areas detected by the IR sensor 37. Therefore, the inside air temperature Tr can be detected without using an inside air temperature sensor. However, an inside air temperature sensor can be provided. In this case, the target air temperature TAO can be calculated based on the inside air temperature detected by the inside air temperature sensor.

Further, the solar radiation amount Ts is calculated by using the following formula (2) based on the air temperatures in the detection areas, detected by the IR sensor 37.

$$Ts = Tdr - Tr - Tam \qquad (2)$$

Figure 5:
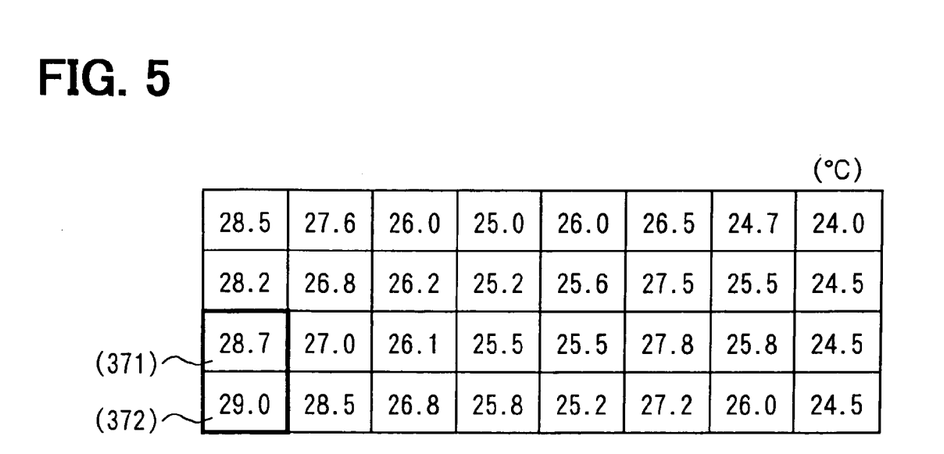
FIG. 5 is a view showing a detection example of the IR sensor according to the first embodiment.

Wherein, Tdr is an average temperature around a window (windshield) at a driver seat, specifically, in two detection areas 371, 372 in FIG. 2 in the first embodiment. A detection example of the IR sensor 37 is shown in FIG. 5. In this case, Tr is defined by the average value of detected temperatures in all of the detection areas, and Tdr is defined by the average value of air temperatures of 28.7° C., 29.0° C. corresponding to the two detection areas 371, 372 shown in FIG. 2. In this way, thermal loads due to the solar radiation can be calculated without using a solar radiation sensor.

Then, at step S300, an open degree of the air mixing door 22a is calculated based on the target air temperature TAO in accordance with the open-degree control characteristic of the air mixing door 22a beforehand stored in the memory device 31. The air mixing door 22a is controlled to have the calculated open degree by an actuator (not shown), thereby controlling the temperature of conditioned air to be blown from each air outlet into the passenger compartment.

Further, at step S300, when the passenger (i.e., a driver frequently riding in the vehicle in the first embodiment) manually operates the temperature setting switch 43 in accordance with preference of the passenger, a relationship between the environmental condition and Tset is learned in accordance with this manual operation. In this way, the learning control is suitably performed so that the air temperature blown into the passenger compartment is controlled at a preferred temperature. Specifically, the stored set temperature Tset is initialized at step S110. When the set temperature Tset is manually changed by using the up switch or the down switch, the target air temperature TAO is calculated based on the set temperature Tset after being learned and changed. Therefore, the temperature of conditioned air is learned and controlled.

Figure 4:
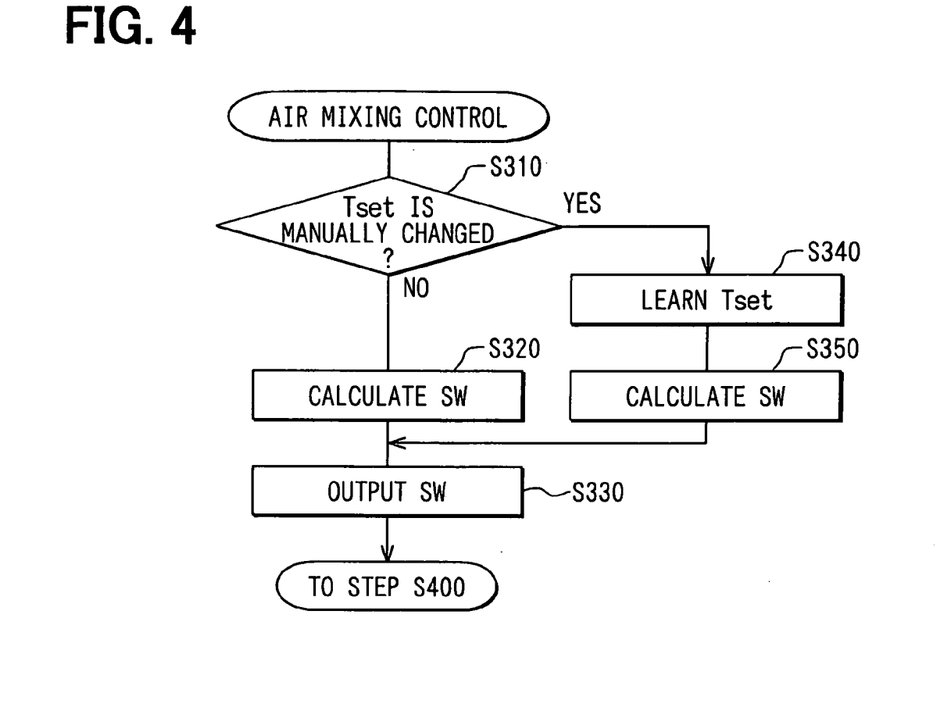
FIG. 4 is a flow diagram showing an air mixing control operation at step S300 shown in FIG. 3.

Here, the air mixing control at step S300 is described in detail with reference to FIG. 4. At step S310, it is determined whether Tset is manually set and changed by manually operating the temperature setting switch 43. When it is determined at step S310 that Tset is not manually set, the target air temperature TAO is calculated at step S320 based on Tset, stored in the memory device 31, corresponding to an outside air temperature and the thermal loads due to the solar radiation at this time. Further, at step S320, a target open degree SW of the air mixing door 22b corresponding to the calculated TAO is calculated as a control value based on a control characteristic stored in the memory device 31. At step S330, the calculated SW is output, and the open degree of the air mixing door 22b is controlled.

Figure 6:
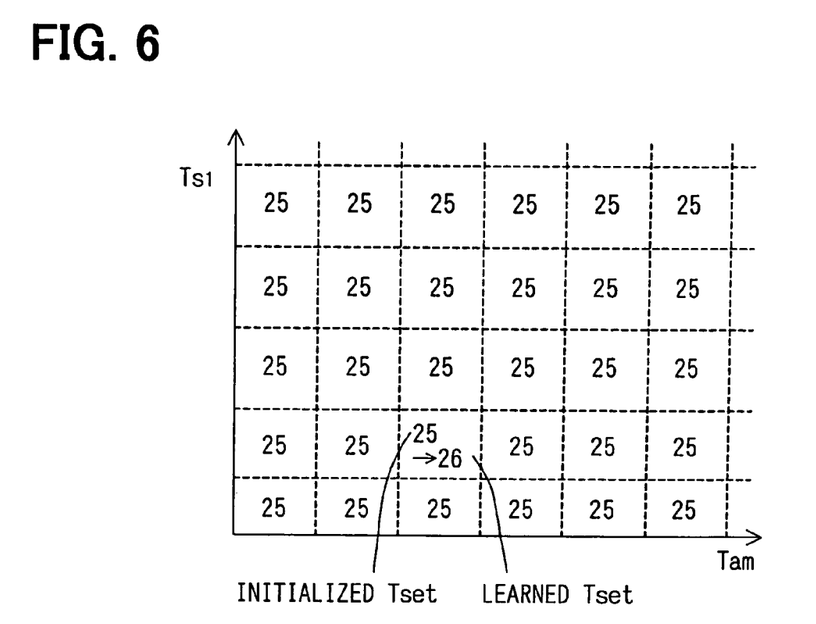
FIG. 6 is a map showing a learning of a set temperature according to the first embodiment.

On the other hand, when it is determined at step S310 that the Tset is manually set, the manually set Tset is learned at step S340. As shown in FIG. 6, the set temperature Tset, stored in the memory device 31, corresponding to a thermal load Tsl due to the solar radiation and an outside air temperature Tam at this time is changed to the manually set temperature Tset. That is, the stored set temperature Tset is read out from a three-dimension map of the outside air temperature Tam, a calculated solar radiation thermal load Tsl and a stored set temperature Tset shown in FIG. 6. The initialized set temperature Tset can be changed to the learned set temperature Tset by the manual operation.

The solar radiation amount Ts is a value of solar radiation acting on the passenger, and the solar radiation amount Ts is calculated by using the formula (2) based on the average temperature Tdr around the window at the driver seat, the inside air temperature Tr and the outside air temperature Tam. The solar radiation amount Ts used for calculating the target air temperature TAO in formula (1) and the calculated solar radiation thermal load Tsl in the three-dimension map of FIG. 6 used for reading the memorized set temperature may be identical to each other or may be differently calculated.

At step S350, the target air temperature TAO is calculated based on the changed (learned) set temperature Tset, and the target open degree SW of the air mixing door 22b corresponding to the calculated target air temperature TAO is calculated based on the control characteristic stored in the memory device 31. At step S330, the target open degree SW is output so that the operation of the air mixing door 22b is controlled. A control operation at step S340 is a control characteristic changing means in the present invention.

After the air mixing control at step S300 is performed, a voltage applied to the blower 27 is calculated based on the target air temperature TAO in accordance with a voltage control characteristic stored in the memory device 31 at step S400. Then, the calculated voltage is applied to the blower 27 through a drive circuit (not shown), thereby driving the blower 27 and controlling the amount of conditioned air to be blown into the passenger compartment. At step S500, the inside-outside air mode is determined based on the target air temperature TAO in accordance with an inside-outside air mode control characteristic stored in the memory device 31. Then, an actuator (not shown) for driving the switching door 22a is controlled to be driven.

At step S600, the air outlet mode corresponding to the target air temperature TAO is determined based on an air-outlet mode control characteristic stored in the memory device 31. Then, an actuator (not shown) for driving the defroster door 22c, the face door 22d and the foot door 22e is controlled to be driven. At steps S400, S500, S600, when the air blowing amount, the inside-outside air mode and the air outlet mode are manually selected, the blower 27 and the doors 22a, 22c–22d are controlled to the manually selected control positions. At step S700, the compressor of the refrigerant cycle is controlled. Thereafter, the control step is returned to step S150 where various signals are input, and the air-conditioning control from step S150 to step S700 is repeated.

Thus, in an automatic control, an ideal set temperature is read out based on the outside air temperature Tam and the calculated solar radiation thermal load Tsl at this time as shown in FIG. 6, and is automatically set. The target air temperature TAO is determined based on the automatically set temperature and the environmental conditions Tr, Tam, Ts. Then, the air mixing door 22b as the temperature adjusting unit and the blower 27 are controlled so that the temperature and the amount of conditioned air to be blown into the passenger compartment are changed in accordance with the target air temperature TAO. The air outlet mode is changed in accordance with the target air temperature TAO. The average temperature Tdr around the window at the driver seat is used for calculating the solar radiation amount Ts, and is further used for calculating the target air temperature TAO. Therefore, the target air temperature TAO is calculated in consideration with the solar radiation direction, and it can prevent a frequently manual operation due to the solar radiation direction.

When the driver manually sets the temperature setting switch 43, the relationship between the outside air temperature Tam, the calculated solar radiation thermal load Tsl and the set temperature Tset is learned. That is, when the set temperature Tset is manually changed, an initialized set temperature is changed to the learned set temperature (manually set temperature) in the stored relationship among the outside air temperature Tam, the calculated solar radiation thermal load Tsl and the set temperature Tset shown in FIG. 6. Then, the target air temperature TAO is calculated in accordance with the changed and learned set temperature, thereby performing the learning control of the air temperature.

In the above-described construction of the first embodiment, the air temperature to be blown into the passenger compartment can be changed based on the solar radiation condition in each detection area, that is, based on the solar radiation amount and the solar radiation direction. Accordingly, uncomfortable feeling given to the passenger (driver) can be reduced, without respect to the solar radiation condition (the solar radiation amount and the solar radiation direction). When the set temperature is changed in accordance with the passenger's preference, this change is stored in the memory device 31 of the control unit 30, thereby learning the air-conditioning characteristic reflecting the passenger's preference in a given solar radiation condition. Accordingly, even if the solar radiation condition is changed, uncomfortable feeling given to the passenger can be reduced, and temperature setting operation can be restricted from being frequently performed due to solar radiation direction.

In the vehicle air conditioner 10 according to the first embodiment, uncomfortable feeling given to the driver is reduced while an air temperature in the entire passenger compartment can be controlled at a set temperature. However, when the vehicle air conditioner 10 controls air temperatures independently at right and left sides in the passenger compartment, or at right, left, front and rear sides therein independently from each other, the control unit 30 receives sensor signals of surface temperatures in detection areas from the IR sensor 37. In this way, air-conditioning operation can be performed for every passenger seat, thereby reducing uncomfortable feeling given to not only the driver but also the other passengers.

(Second Embodiment)

In the above-described first embodiment, the solar radiation amount Ts and the calculated solar radiation thermal load Tsl are obtained from the average temperature Tdr around the window (windshield) at the driver seat, the inside air temperature Tr and the outside air temperature Tam, without using a solar radiation sensor. However, a one-dimension solar radiation sensor having low cost, which can detect the solar radiation amount but does not detect the solar radiation direction, is used in the second embodiment. Further, in the above-described first embodiment, the solar radiation amount Ts is obtained by using formula (2) based on the average temperature Tdr in the area near the windshield of the driver's seat, the inside air temperature Tr and the outside air temperature Tam. However, in the second embodiment, a solar radiation amount Tsdr, used for calculating the target air temperature TAO for the driver's seat, is obtained as follows.

Figure 7:
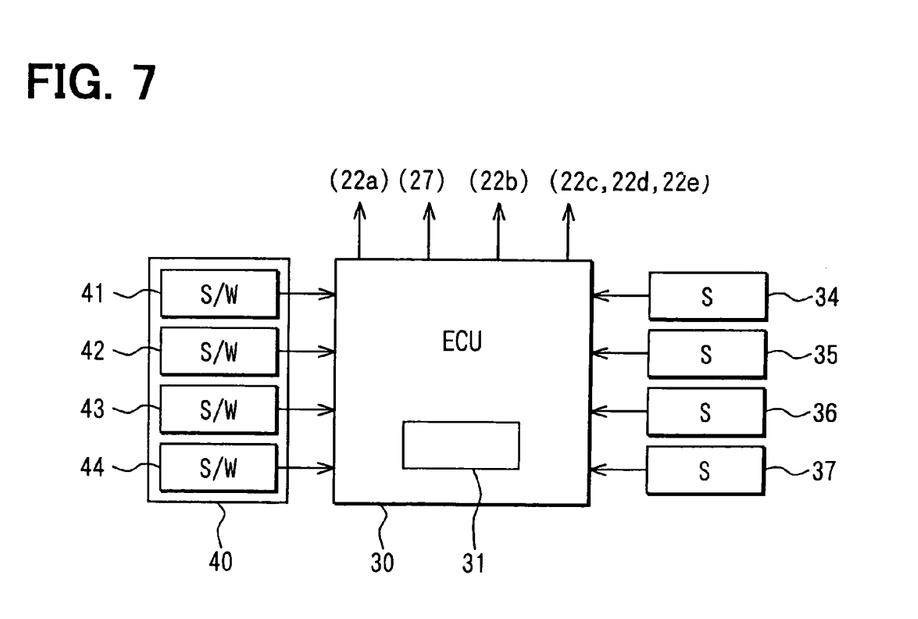
FIG. 7 is a schematic diagram showing a main part of a vehicle air conditioner according to a second embodiment of the present invention.

That is, as shown in FIG. 7, a solar radiation sensor 36a for detecting a solar radiation amount Tso is provided as the environmental condition detecting device. The solar radiation sensor 36a is the one-dimension solar radiation sensor. In the second embodiment, the detected solar radiation amount Tso is multiplied by a predetermined ratio so that a solar radiation amount Tsdr distributed to the driver's seat can be calculated. Here, the predetermined ratio is a ratio of a difference between a driver seat temperature and an average inside air temperature Tr to the sum of differences between passenger seat temperatures and the average inside air temperature Tr. The driver seat temperature and the passenger seat temperatures are detected by the IR sensor 37 as an area temperature detecting device. In this way, the solar radiation amount Tsdr distributed to the driver seat can be calculated. Then, the target air temperature TAO for the driver seat is calculated by using the solar radiation amount Tsdr. The stored set temperature Tset is read out from the three-dimension map shown in FIG. 6 by using the solar radiation amount Tsdr, thereby performing automatic control where the set temperature is automatically set in accordance with the environmental condition values. In the second embodiment, the same portions as in the first embodiment are indicated by the same reference numerals, respectively, and description thereof is eliminated. Although not shown in the drawing, the air conditioning unit 20 performs right-left and front-rear independent control, that is, air-conditioning control for every passenger seat, in the second embodiment.

According to the second embodiment, the target air temperature TAO to be blown from an air outlet corresponding to each passenger seat into the passenger compartment, is calculated by using the solar radiation amount Tso detected by the solar radiation sensor 36. The solar radiation amount, corresponding to each passenger seat, is calculated based on the surface temperature in each detection area detected by the IR sensor 37 and the solar radiation amount detected by the solar radiation sensor 36. For example, as described above, the solar radiation amount Tsdr, used for calculating the target air temperature TAO to be blown to the driver seat, is the product of the solar radiation amount Tso detected by the solar radiation sensor 36 and the predetermined ratio. Here, the predetermined ratio is a ratio of the difference between the driver seat temperature and the average inside air temperature Tr to the sum of differences between the passenger seat temperatures and the average inside air temperature Tr. Thus, an accurate solar radiation thermal load can be obtained for every passenger seat by using the solar radiation amount Tso detected by the solar radiation sensor 36, to be weighted to each passenger seat.

In the second embodiment, relative to the solar radiation amount Tso detected by the solar radiation sensor 36, a weighted amount (distributed amount) is added for each passenger seat in accordance with the solar radiation direction and the like obtained from the detection results of the IR sensor 37 (temperature distribution in the detection areas).

The air-conditioning control as in the first embodiment is performed based on the solar radiation thermal load obtained in this way. Therefore, the air temperature to be blown into the passenger compartment can be changed for every passenger seat (i.e., every area in the passenger compartment in the front-rear and right-left directions) in accordance with the solar radiation condition such as the solar radiation amount and the solar radiation direction. Accordingly, the uncomfortable feeling given to the passenger can be reduced regardless of the solar radiation condition such as the solar radiation amount and the solar radiation direction. When the set temperature is changed in accordance with a passenger's preference, the control unit 30 stores this change in the memory device 31, thereby learning the air-conditioning characteristic reflecting the passenger's preference in a given solar radiation condition for every passenger seat. Accordingly, even if the solar radiation condition is changed, the uncomfortable feeling given to the passenger can be reduced, and the temperature setting operation can be restricted from being frequently performed.

(Third Embodiment)

In the third embodiment, the learning control of the air blowing amount is further added to the control operation of the second embodiment. The third embodiment will be described with reference to FIGS. 8, 9A, 9B. When an air amount switch 44 is manually switched, an initial voltage characteristic 271 is corrected to a learned voltage characteristic 272 by using the characteristic map showing the relationship between the outside air temperature Tam and the calculated solar radiation thermal load Tsl shown in FIG. 9A, and a characteristic graph showing a relationship between the target air temperature TAO and a voltage V applied to the blower 27 shown in FIG. 9B. For example, the characteristic graph shown in FIG. 9B is stored for every area set by the outside air temperature Tam and the calculated solar radiation load Ts1 shown in FIG. 9A. In the third embodiment, the portions similar to the first and second embodiments are indicated by the same reference numerals respectively, and description thereof is eliminated.

Since a passenger's preference relative to the air blowing amount is different for every passenger, it is difficult to set the voltage applied to the blower 27 (air blowing amount) by using a uniformly voltage control characteristic. When the air amount switch 44 is manually switched by a passenger, this manual switch operation is leaned in the voltage control characteristic, thereby controlling the air blowing amount in accordance with the passenger's preference, and suitably performing the learning control. In the third embodiment, the air amount switch 44 is used for manually setting the air blowing amount.

Figure 8:
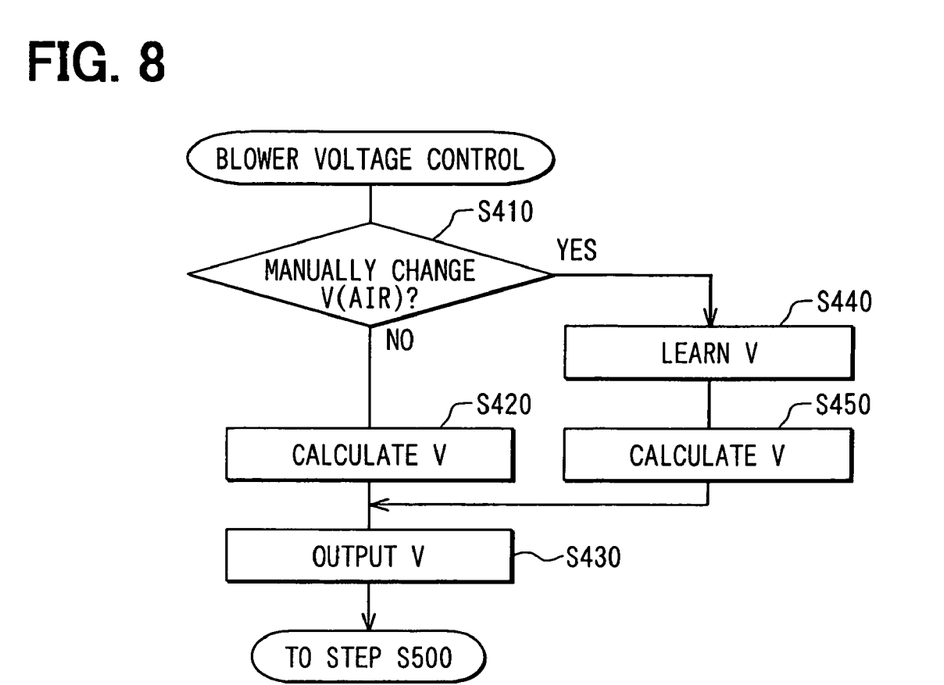
FIG. 8 a flow diagram showing a blower voltage control operation according to a third embodiment of the present invention.

FIG. 8 shows a detail control operation of the blower voltage control at step S400 shown in FIG. 3. At step S410 shown in FIG. 8, it is determined whether the air blowing amount V (AIR) is manually changed by operating the air amount switch 44. When it is determined at step S410 that the air blowing amount V (AIR) is not manually changed, the voltage applied to the blower 27 is calculated by using a voltage control characteristic stored in the memory device 31, corresponding to the solar radiation thermal load and the outside air temperature at this time. At step S430, the calculated voltage is output to the blower 27, thereby controlling the air blowing amount of the blower 27.

Figure 9A:
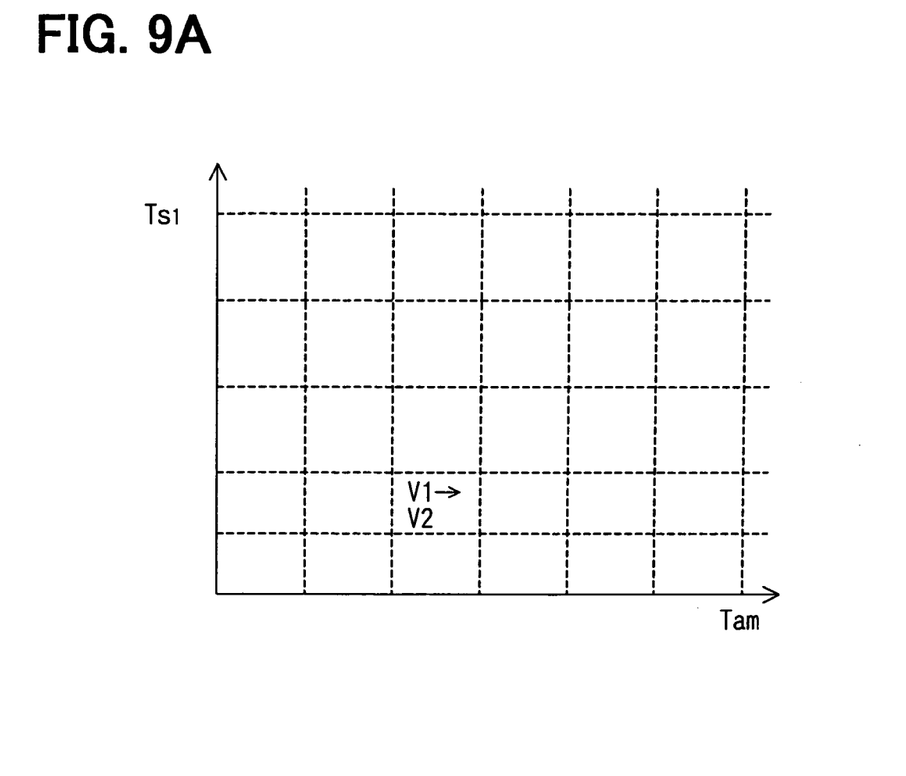
FIG. 9A is a map for explaining a learning of a voltage applied to a blower according to the third embodiment.
Figure 9B:
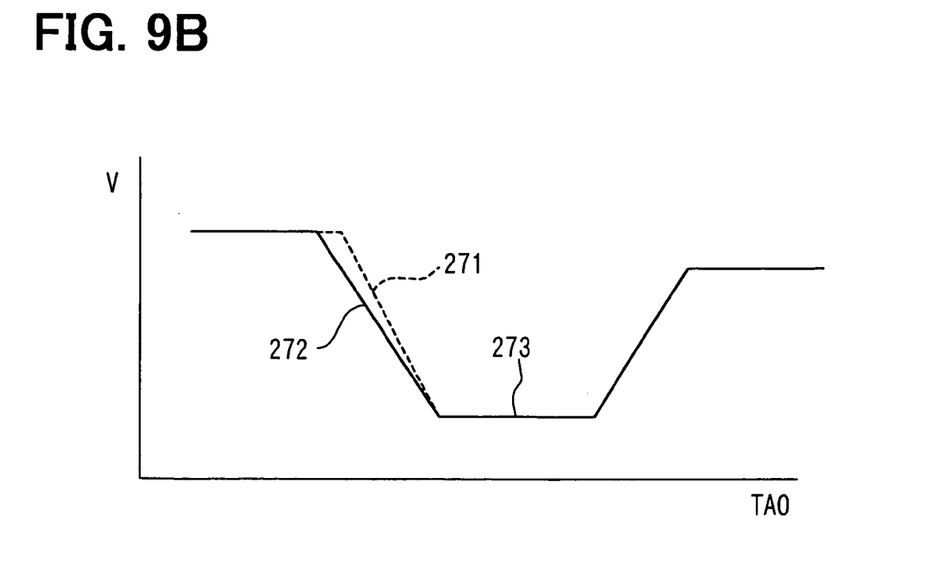
FIG. 9B is a graph showing a control characteristic of the voltage applied to the blower according to the third embodiment.

On the other hand, when it is determined at step S410 that the air blowing amount V (AIR) is manually changed, this change is learned at step S440. As shown in FIG. 9A, a voltage characteristic, in an area corresponding to the solar radiation thermal load Ts1 and the outside air temperature Tam at this time, is changed to the manually changed voltage. For example, as shown in FIG. 9A, a stored voltage V1 (e.g., initialized voltage) is changed so as to be approximated to the manually changed voltage V2 (manually input voltage) by using the least square approximation technique. In this way, as shown in FIG. 9B, the initial characteristic 271 is changed to the learned characteristic 272, and the learned characteristic 272 is stored in the memory device 31. Further, as the solar radiation amount (solar radiation thermal load) increases, the lowest level line 273 of the voltage V is increased. However, the lowest level line 273 is not changed by the learning.

At step S450 in FIG. 8, based on the changed voltage characteristic described above, the voltage applied to the blower 27 is calculated to correspond to the environmental condition at this time. At step S430, the calculated voltage is output, thereby controlling the air blowing amount of the blower 27. Step S440 is a control characteristic changing means in the present invention.

In the control of the air temperature of the third embodiment, as in the second embodiment, the solar radiation thermal load can be obtained for every passenger seat by using the solar radiation amount Tso to be weighted to each passenger seat. In this case, relative to the solar radiation amount Tso, a weighted amount (a distributed amount) is added for each passenger seat in accordance with the solar radiation direction and like obtained from the temperature distribution in the detection area of the IR sensor (surface temperature detecting device) 37. Therefore, the air mixing door 22b is controlled based on the accurate solar radiation thermal load, and the air temperature can be accurately changed for every passenger (every area in the front-rear and right-left directions in the passenger compartment).

On the other hand, in the control of the voltage applied to the blower 27, the solar radiation load (second solar radiation thermal load) is obtained from the solar radiation amount detected by the solar radiation sensor 36, without respect to the detection results of the IR sensor (surface temperature detecting device, area temperature detection device) 37. The obtained solar radiation thermal load is used as the calculated solar radiation thermal load Tsl, thereby preventing the air blowing amount from being carefully controlled.

The inventors of this application find that the passenger's preference relating to the air amount blown by the blower relates not only passenger thermal-feeling but also air-blowing noise and the like. If the air blowing amount is carefully controlled in accordance with the solar radiation thermal load in each area in the passenger compartment, the uncomfortable feeling may be given to the passenger.

In the third embodiment, the air mix door 22b is controlled in accordance with the target air temperature TAO that is calculated based on the solar radiation condition including the solar radiation amount and the solar radiation direction. Therefore, the same operational effect as in the second embodiment can be obtained. On the other hand, the air blowing amount of the blower 27 is controlled in accordance with the total solar radiation amount detected by the solar radiation sensor 36, without respect to a solar radiation condition in each area of the passenger compartment. Therefore, uncomfortable feeling given to the passenger can be surely reduced.

(Other Embodiments)

In the above-described embodiments, the IR sensor 37 is used as a surface temperature detecting means (area-temperature detecting means) in each area of the passenger compartment. However, for example, temperature detecting elements may be disposed around an inner surface of the passenger compartment in detection areas, respectively, without being limited to this manner. Incidentally, the IR sensor 37 can detect the surface temperatures in the plural detection areas more simply than the plural temperature detecting elements. Further, in the above embodiments, the control unit 30 learns the air-conditioning control characteristic. However, in a vehicle air conditioner that does not perform a learning control, a control unit may control an operation portion based on a surface temperature in each detection area of the passenger compartment.

In the above-described second and third embodiments, the solar radiation sensor 36 is used for obtaining the total solar radiation thermal load (total solar radiation amount). However, the total solar radiation thermal load may be calculated based on the average temperature of surface temperatures detected by the IR sensor 37, without using the solar radiation sensor 36. In the above embodiments, the air mixing door 22b and the blower 27 are used as the operation portion of the air conditioning unit 20. However, for example, the air-outlet mode doors 22c, 22d, 22e and the air-inlet mode door 22a may be used as the operation portion, without being limited to this manner. In this case, the air outlet mode or the air introduction mode is changed in accordance with the solar radiation condition. Further, a louver provided in an air outlet (not shown) may be used as the operation portion. In this case, a blowing direction of conditioned air is changed in accordance with the solar radiation condition.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An air conditioner for a vehicle, comprising:
an air conditioning unit for performing air conditioning of a passenger compartment of the vehicle, the air conditioning unit including an operation portion that being operable in the air conditioning;
an environmental-condition detecting device for detecting an environmental condition of the vehicle;
control characteristic memory means for storing a control characteristic showing a relationship between the environmental condition detected by the environmental-condition detecting device and a control value applied to the operation portion;
a control unit for controlling operation of the operation portion based on the control characteristic stored in the control characteristic memory means, by using the environmental condition detected by the environmental-condition detecting device; and
a manual setting device for manually setting the control value of the operation portion,
wherein the environmental-condition detecting device includes a surface temperature detecting means for detecting at least one of an inner surface temperature of the passenger compartment and a surface temperature of a passenger as the environmental condition, in each of plural detection areas of the passenger compartment;

the control unit calculates a solar radiation thermal load based on a temperature of at least an area close to a window of the vehicle, among temperatures of the plural detection areas detected by the surface temperature detecting means;

the control characteristic memory means stores plural control values as control characteristics applied to the operation portion in accordance with the solar radiation thermal load; and when the manual setting device manually chances a control value of the operation portion at a time, the control unit changes a control value calculated based on the solar radiation thermal load at the time, among the plural control values stored in the control characteristic memory means.

2. The air conditioner according to claim 1, wherein the control unit controls the operation portion by using the surface temperature detected by the surface temperature detecting means in each detection area of the passenger compartment, so as to perform air conditioning of the passenger compartment for every passenger seat.

3. The air conditioner according to claim 1, further comprising a manual setting device for manually setting the control value applied to the operation portion, wherein the control unit has a control-characteristic changing means for changing the control characteristic stored in the control characteristic memory means when the control value is manually changed by the manual setting device in a given environmental condition of the control characteristic.

4. The air conditioner according to claim 3, wherein:

the operation portion includes an air temperature adjusting device for adjusting a temperature of conditioned air to be blown into the passenger compartment;

the environmental-condition detecting device further includes a solar radiation amount detecting means for detecting a solar radiation amount radiated into the passenger compartment; and the control characteristic memory means stores a relationship between a control value applied to the air temperature adjusting device and a first solar radiation thermal load obtained based on the solar radiation amount detected by the solar radiation amount detecting means and the surface temperature detected by the surface temperature detecting means in each detection area of the passenger compartment, as a control characteristic for controlling the air temperature adjusting device.

5. The air conditioner according to claim 1, wherein:

the control unit calculates a solar radiation thermal load based on the surface temperature detected by the surface temperature detecting means in each detection area of the passenger compartment; and the control characteristic memory means stores a relationship between the solar radiation thermal load and the control value applied to the operation portion, as the control characteristic.

6. The air conditioner according to claim 1, wherein:

the environmental-condition detecting device includes a solar radiation amount detecting means for detecting a solar radiation amount radiated into the passenger compartment;

the control unit calculates a solar radiation thermal load based on the surface temperature detected by the surface temperature detecting means in each detection area of the passenger compartment and the solar radiation amount detected by the solar radiation amount detecting means; and the control characteristic memory means stores a relationship between the solar radiation thermal load and the control value applied to the operation portion, as the control characteristic.

7. The air conditioner according to claim 1, wherein the surface temperature detecting means is an infrared rays sensor for detecting an infrared-ray intensity in each detection area.

8. The air conditioner according to claim 1, wherein the control unit calculates the solar radiation thermal load by using a temperature of air inside the passenger compartment in addition to the temperature of the area close to the window.

9. The air conditioner according to claim 8, wherein the control unit calculates the solar radiation thermal load by using a temperature of air outside the passenger compartment in addition to the temperature of air inside the passenger compartment and the temperature of the area close to the window.

10. The air conditioner according to claim 8, wherein the temperature of air inside the passenger compartment is an average value of temperatures of the plural detection areas detected by the surface temperature detecting means.

11. The air conditioner according to claim 8, further comprising an inside air temperature detecting unit disposed to detect the temperature of air inside the passenger compartment.

12. The air conditioner according to claim 1, wherein:

the environmental-condition detecting device further includes a solar radiation detecting means for detecting a solar radiation amount entering into the passenger compartment; and the control unit calculates the solar radiation thermal load by using the solar radiation amount detected by the solar radiation detecting means in addition to the temperature of the area close to the window.

13. The air conditioner according to claim 1, wherein:

the operation portion includes an air temperature adjusting device for adjusting a temperature of conditioned air to be blown into the passenger compartment;

the control value of the operation portion is a set temperature for the conditioned air;

the control characteristic memory means stores a relationship between the set temperature and the solar radiation thermal load as the control characteristic; and when the manual setting device manually changes the set temperature at a time, the control unit changes a set temperature calculated based on the solar radiation thermal load at this time among plural set temperatures stored in the control characteristic memory means.

14. The air conditioner according to claim 1, wherein:

the operation portion further includes a blower for blowing conditioned air of the air conditioning unit into the passenger compartment;

the control value of the operation portion is a voltage applied to the blower;

the control characteristic memory means stores a relationship between the voltage applied to the blower and the solar radiation thermal load; and when the manual setting device manually changes the voltage applied to the blower at a time, the control unit changes a voltage calculated based on the solar radiation thermal load at this time among plural voltages stored in the control characteristic memory means.

15. The air conditioner according to claim 1, wherein:
the environmental-condition detecting device detects a temperature of air outside the passenger compartment as the environmental condition;
the control characteristic memory means stores plural control values as control characteristics applied to the operation portion in accordance with the solar radiation thermal load and the temperature of air outside the passenger compartment; and
when the manual setting device manually changes the control value at a time, the control unit changes a control value calculated at this time based on the solar radiation thermal load and the temperature of air outside the passenger compartment, among the plural control values stored in the control characteristic memory means.

16. The air conditioner according to claim 1, wherein the control unit calculates the solar radiation thermal load based on an average value of temperatures of plural detection areas close to the window, among the temperatures of the detection areas detected by the surface temperature detecting means.

17. An air conditioner for a vehicle, comprising:
an air conditioning unit for performing air conditioning of a passenger compartment of the vehicle, the air conditioning unit including an operation portion that being operated in the air conditioning;
an environmental-condition detecting device for detecting an environmental condition of the vehicle;
a control characteristic memory means for storing a control characteristic showing a relationship between the environmental condition detected by the environmental-condition detecting device and a control value applied to the operation portion;
a manual setting device for manually setting the control value applied to the operation portion; and
a control unit for controlling operation of the operation portion based on the control characteristic stored in the control characteristic memory means, by using the environmental condition detected by the environmental-condition detecting device; wherein
the environmental-condition detecting device includes a surface temperature detecting means for detecting at least one of an inner surface temperature of the passenger compartment and a surface temperature of a passenger, in each detection area of the passenger compartment;
the control unit has a control-characteristic changing means for changing the control characteristic stored in the control characteristic memory means when the control value is manually chanced by the manual setting device in a given environmental condition of the control characteristic;
the operation portion includes an air temperature adjusting device for adjusting a temperature of conditioned air to be blown into the passenger compartment;
the environmental-condition detecting device further includes a solar radiation amount detecting means for detecting a solar radiation amount radiated into the passenger compartment;
the control characteristic memory means stores a relationship between a control value applied to the air temperature adjusting device and a first solar radiation thermal load obtained based on the solar radiation amount detected by the solar radiation amount detecting means and the surface temperature detected by the surface temperature detecting means in each detection area of the passenger compartment, as a control characteristic for controlling the air temperature adjusting device;
the operation portion further includes a blower for blowing conditioned air of the air conditioning unit into the passenger compartment; and
the control characteristic memory means stores a relationship between a control value applied to the blower and a second solar radiation thermal load obtained from the solar radiation amount detected by the solar radiation detecting device.

18. An air conditioner for a vehicle, comprising:
a temperature adjusting unit for adjusting a temperature of conditioned air to be blown into a passenger compartment of the vehicle;
a blower for blowing conditioned air into the passenger compartment;
an area temperature detecting device for detecting temperatures in a plurality of detection areas around a passenger in the passenger compartment, the detection areas at least include an area where the temperature is changed in accordance with a solar radiation direction;
a target temperature calculating means for calculating a target air temperature based on at least a set temperature, an inside air temperature inside the passenger compartment, an outside air temperature outside the passenger compartment and a solar radiation amount that is calculated based on the temperature detected by the area temperature detecting device; and
a control means for controlling the temperature and a flow amount of conditioned air to be blown into the passenger compartment by controlling the temperature adjusting unit and the blower in accordance with the calculated target air temperature,
wherein the control means determines an air outlet mode in accordance with the calculated target air temperature.

19. The air conditioner according to claim 18, wherein the area temperature detecting device is constructed with a surface temperature detecting means for detecting at least one of an inner surface temperature of the passenger compartment and a surface temperature of a passenger in each detection area of the passenger compartment.

20. The air conditioner according to claim 18, wherein the area temperature detecting device is constructed with a plurality of temperature detecting elements each of which is disposed near the inner surface of the passenger compartment in detection areas of the passenger compartment.

21. The air conditioner according to claim 18, wherein
the inside air temperature is an average temperature of the temperatures in the detection areas, detected by the area temperature detecting device.

22. The air conditioner according to claim 18, wherein the solar radiation amount is obtained from an average temperature of the temperatures in the detection areas around a windshield of a driver's seat side, detected by the area temperature detecting device.

23. The air conditioner according to claim 22, wherein
the control means calculates the solar radiation amount Ts by a formula of Ts=Tdr−Tr−Tam, in which Tdr is the average temperature, Tr is the inside air temperature, Tr is the inside air temperature and Tam is the outside air temperature.

24. The air conditioner according to claim 18, further comprising:

a temperature setting switch for manually setting a set temperature of conditioned air to be blown into the passenger compartment; and a learning means for learning a relationship between the outside air temperature and the solar radiation amount which are environmental condition, and the set temperature, when the temperature setting switch I manually operated.

25. The air conditioner according to claim 24, wherein the learning means is constructed with:

a memory means for storing the learned relationship as a control characteristic;

a changing means for changing an initial set temperature to a learned set temperature in the control characteristic showing the learned relationship when the set temperature is manually changed by the temperature setting switch; and the target-temperature calculating means for calculating a target air temperature in accordance with the learned set temperature.

26. The air conditioner according to claim 18, further comprising:

a solar radiation detecting means for detecting only a total amount of solar radiation radiated into the passenger compartment; and a solar radiation amount calculating means for calculating a solar radiation amount corresponding to each of plural seat areas by using the detected total amount of solar radiation and a weighted value that is obtained from the area temperature detected by the area temperature detecting device in consideration of the solar radiation direction for each respective seat area in the passenger compartment, wherein the target-temperature calculating means calculates a target temperature of conditioned air to be blown to each seat area based on the solar radiation amount corresponding to each seat area.

27. The air conditioner according to claim 26, wherein the solar radiation detecting means is constructed with a solar radiation sensor.

28. The air conditioner according to claim 26, wherein the solar radiation detecting means calculates the total amount of solar radiation based on an average temperature in each detection area, detected by the area temperature detecting device.

* * * * *